(12) United States Patent
Borowsky et al.

(10) Patent No.: US 6,606,585 B1
(45) Date of Patent: Aug. 12, 2003

(54) ACCEPTABILITY TESTING FOR CAPACITY PLANNING OF DATA STORAGE SYSTEM

(75) Inventors: Elizabeth Lynn Borowsky, Brookline, MA (US); Richard Golding, San Francisco, CA (US); Arif Merchant, Los Altos, CA (US); Mirjana Spasojevic, Palo Alto, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/379,204

(22) Filed: Aug. 21, 1999

Related U.S. Application Data (63) Continuation-in-part of application No. 09/172,114, filed on Oct. 13, 1998, now Pat. No. 6,119,174.

(51) Int. Cl.[7] ............................ G06F 7/60; G06F 17/10; G06F 101/00
(52) U.S. Cl. ............................ 703/2; 702/179; 702/182; 702/709; 702/224; 702/710; 702/15
(58) Field of Search .............................. 703/1–2, 19–22; 710/15–19; 702/179–186; 709/224

(56) References Cited

U.S. PATENT DOCUMENTS 6,119,174 A * 9/2000 Borowsky et al. .......... 702/182

OTHER PUBLICATIONS

Shriver, "Performance Modeling for Realistic Storage Devices", Ph.D. dissertation, pp. 1–276 (May 1997) (text downloaded from: http://citeseer.nj.nec.com/shriver97performance.html).*
Benjaafar et al, "Workload Allocation in Multi–Product, Multi–Facility Production Systems with Setup Times", IIE Transactions, vol. 31, No. 4, pp. 339–352 (Apr. 1999).*
Elizabeth L. Borowosky et al.—Capacity Planning With Phased Workloads—Oct. 1998 pp. 199–207.
Elizabeth Shriver et al.—An Analytic Behavior Model for Disk Drives With Readhead Caches and Request Reordering—Jun. 1998—Pabes 182–191.
IBM Technical Disclosure Bulletin, US—Method to Estimate Resource Capacity Based on Probability of Concurrent Activity—Jun. 1998—pp. 277–280.

* cited by examiner

*Primary Examiner*—Samuel Broda, Esq.

(57) ABSTRACT

Data storage devices of an enterprise system are tested to determine whether the enterprise system is optimally configured. Each data storage device is tested to determine whether it can satisfy a performance requirement for an assigned group of n workloads. A group of n inequalities are generated, and only up to n of the inequalities may be evaluated to determine whether the device satisfies the performance requirement for the assigned group of workloads. The inequalities are based on a phased, correlated model of I/O activity.

29 Claims, 6 Drawing Sheets

ACCEPTABILITY TESTING FOR CAPACITY PLANNING OF DATA STORAGE SYSTEM

This is a continuation-in-part of U.S. Ser. No. 09/172,114 filed on Oct. 13, 1998, and issued as U.S. Pat. No. 6,119,174.

BACKGROUND OF THE INVENTION

The present invention relates to data storage systems. More specifically, the present invention relates to capacity planning of data storage systems.

Configuration and management of a data storage system can be a major undertaking. Involved is evaluating whether a set of devices, a set of applications and a storage layout (i.e. an assignment of storage on devices to applications) can satisfy cost, performance (throughput and capacity), and reliability requirements.

A large enterprise system typically deals with many terabytes of data spread over a range of physical devices. The difficulties inherent in configuration and management are compounded by the sheer scale of such a system. Additionally, a high-end application (e.g., OLTP, decision support system) tends to exhibit fairly complex behavior. The question of how to distribute data over a range of storage devices while providing some sort of performance guarantees is not trivial.

The configuration and management difficulties are further compounded because the configuration of the data storage system is dynamic. After the system is initially configured, the configuration is likely to change. Applications and databases are added, new devices are added, older devices that become obsolete or defective are removed and replaced by devices having different characteristics, etc. Adding to the complexity of configuring the system is the use of network-attached storage devices along with a client's desire to share the stored data across multiple computer systems with nearly arbitrary interconnection topologies via fiber-channel networks and other storage fabrics.

The complexity of configuration and management can lead to poor provisioning of the resources ("capacity planning"). Poor capacity planning, in turn, can result in the use of more data storage devices than needed, which can needlessly add to the cost of the data storage system.

Additional problems can flow from poor capacity planning. Poor allocation of data among different devices can reduce throughput. For example, two data sets (e.g., two database tables) that are stored on the same device might be accessed at the same time. Those two data sets could compete for the same throughput resources and potentially cause a bottleneck and queuing delays.

Queuing delays arise when a storage device is in the process of servicing a request and receives additional requests. The additional requests are usually queued and will not be serviced until an outstanding request is completed by the device. Eventually, the storage device will catch up and service all of the requests that are queued. In the interim, however, response time will suffer.

It is extremely useful to be able to identify these problems. The problems can be identified by testing an initial or subsequent system configuration to determine whether its devices satisfy certain performance requirements. The performance of the storage system may be measured with a number of attributes such as capacity, speed and Quality-of-Service ("QoS") guarantees.

If a device cannot satisfy the performance requirement, it might be replaced by a more capable device, data thereon might be transferred to a different device, etc. The system can be reconfigured until all of the performance requirements are met.

The testing may be performed by mathematically modeling each device of the storage system and determining whether each model satisfies the performance requirements. The most common method for predicting the performance of a group of workloads on a device is to approximate the workloads as being independent. This simplifies the testing considerably. In many cases, the workloads are treated as continuous (instead of bursty), which simplifies the testing even further. However, these approximations are often not accurate enough for practical use. For example, a group of six workloads might fit well on a single device if they are never "ON" at the same time, even if each workload requires the entire resources of the device while ON. Moreover, real workloads are often bursty—they have periods of high rates of data requests ("ON" periods) interspersed by periods of little or no activity ("OFF" periods). Additionally, the burst activities of different workloads are usually correlated. For example, some workloads always produce requests at the same time, while others never produce requests at the same time.

At the other extreme, it is possible to treat workload correlation in full generality, by combining groups of the workloads into a single workload having a request rate that depends upon the combined state of the individual workloads (ON or OFF). These models include the Markov Modulated Poison Process ("MMPP") and Markov Modulated Fluid Flow ("MMFF") models. The difficulty here is that, for a group of n workloads, each of which can be ON or OFF, the combined workload has $2^n$ states. In most cases, assumptions (e.g., all processes are identical) are made to simplify the testing of a single device and make the testing computationally tractable. Still, the number of computations for a single test might be enormous. Moreover, it might be impractical to configure a system by performing thousands of repeated tests until an optimal configuration can be found for a given set of devices.

Complexity of the testing increases as the size of the storage system increases. Thus, for a high-end application, which typically deals with many terabytes of data spread over a range of physical devices and which support applications exhibiting complex behavior, testing of even a single configuration can be extremely slow to perform.

Significant advantages could be realized by a test that is performed quickly and efficiently. System designers are often faced with a wide choice of data storage devices (e.g., different manufacturers, sizes, access times) and options for storing data on different devices. There might be thousands of different configurations to test. A fast and efficient test would allow many different configurations to be tested and the optimal configuration to be identified.

Therefore, a need exists for such a fast and efficient test.

SUMMARY OF THE INVENTION

The present invention provides a quick and efficient test for determining whether a performance requirement is satisfied by a data storage device that is assigned a group of workloads. At least one performance requirement model for each workload in the group is assigned. Each model is an increasing function of request rate. The request rate of a given workload is approximated by a distribution process describing ON/OFF behavior of the given workload. A computer is used to evaluate at least one model in the group to determine whether the device satisfies the performance requirement.

Other aspects and advantages of the present invention will become apparent from the following detailed description, taken in conjunction with the accompanying drawings, illustrating by way of example the principles of the present invention.

DETAILED DESCRIPTION OF THE INVENTION

As shown in the drawings for purposes of illustration, the invention is embodied in a method and apparatus for testing whether performance requirements are satisfied if a given group of workloads is assigned to a data storage device. The test is based on a phased, correlated model of I/O activity in the group of workloads assigned to the device. The testing is simple and it can be performed quickly, which makes it especially desirable for capacity planning of large enterprise systems.

In the paragraphs that follow, the testing will first be described in connection with a single data storage device. Then, the testing will be described in connection with an enterprise system and a system including a configuration engine for configuring the enterprise system. First, however, certain terminology will be established.

A "store" will hereinafter refer to a unit of data storage on a data storage device. For example, a store might be a logical unit of data, such as a file, a database table or a portion thereof. The store might reside on a single device, or it might be striped over a range of devices.

Data flowing between a host and a store will hereinafter be referred to as a "stream." A stream is a collection of I/O requests for data housed by a particular store.

Multiple streams might access the same store at a given time. The total collection of streams corresponding to a store will be referred to as the "workload" corresponding to the store. Thus, a workload constitutes the sum of I/O activity for a store at a given time.

Figure 1:
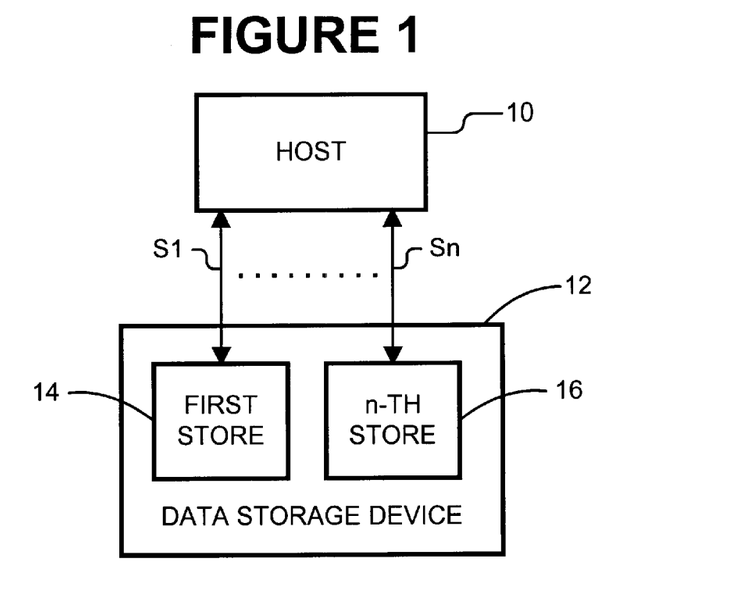
FIG. 1 is an illustration of I/O activity between a host and a data storage device.

Reference is now made to FIG. 1, which illustrates the flow of data between a host 10 and a data storage device (e.g., a hard drive) 12. A number n of stores reside on the same data storage device 12 (only the first and $n^{th}$ stores 14 and 16 are shown). To simplify the explanation of the invention, each store will be assigned to only a single device, and each workload will include only a single stream. Thus, workloads will hereinafter be used interchangeably with streams.

A first stream S1 represents the flow of data between the host 10 and the first store 14, and an $n^{th}$ stream Sn represents the flow of data between the host 10 and the $n^{th}$ store 16. For each additional store on the data storage device 12, there is an additional stream representing the flow of data between that additional store and the host 10.

The data does not actually flow between the host 10 and the data storage device 10 in separate streams. However, the concept of separate "streams" will be useful to determine phase relationships of the streams S1 to Sn.

Figure 2:
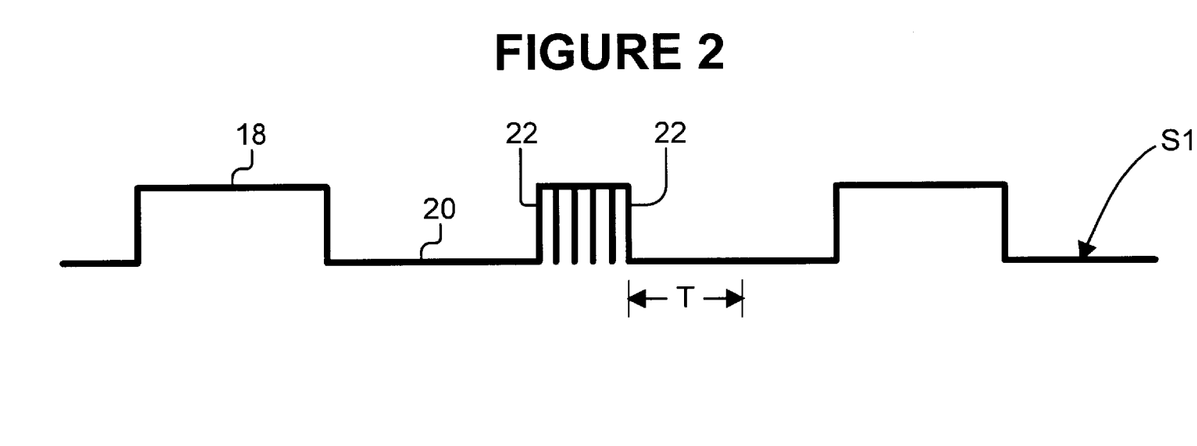
FIG. 2 is an illustration of I/O activity in a stream corresponding to a first store in the data storage device.

A graphical representation of the first stream S1 is shown in FIG. 2. I/O activity in the first stream S1 is characterized by "ON" phases (such as phase 18) and "OFF" phases (such as phase 20). Periods of significant I/O activity correspond to the ON phases and periods of no I/O activity correspond to the OFF phases. The ON phases are defined by I/O requests 22.

Certain workloads are "bursty" in that there are periods with high rates of data requests (i.e., ON phases) interspersed by periods of little or no activity (i.e., OFF phases). The bursty activity of workloads might follow patterns. For example, some groups of workloads might produce requests at the same time, while other groups of workloads never produce requests at the same time.

Figure 3:
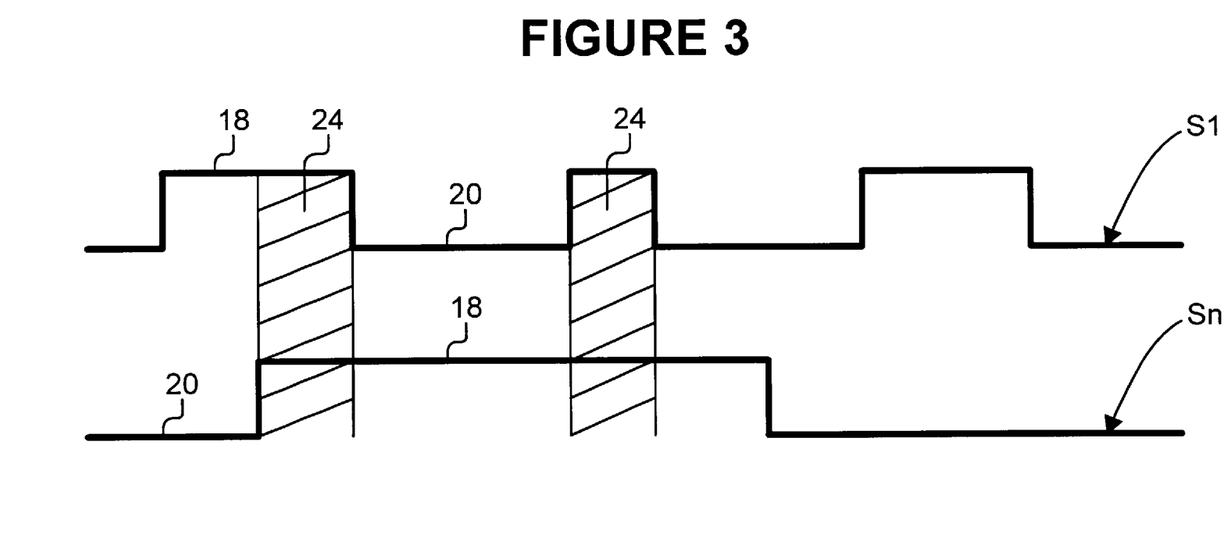
FIG. 3 is an illustration of I/O activity overlap between the first stream and a second stream corresponding to a second store in the data storage device.

Phases of overlap 24 between two streams S1 and Sn are illustrated in FIG. 3. The cross-hatched areas 24 represent the intervals that the first and $n^{th}$ streams S1 and Sn are ON at the same time.

A probability of overlap $p_{ji}$ can be modeled, measured or estimated to indicate the degree of simultaneous activity between the $i^{th}$ and $j^{th}$ streams, where $j \leq n$ (e.g., the first and $n^{th}$ streams S1 and Sn). The probability $p_{ji}$ represents the probability that the $i^{th}$ workload Si is already ON when $j^{th}$ workload Sj comes ON.

The probability $p_{ji}=0$ corresponds to an $i^{th}$ workload Si that is never ON when a $j^{th}$ workload Sj comes ON. The probability $p_{ji}=1.0$ corresponds to an $i^{th}$ workload Si that is always ON when a $j^{th}$ workload Sj comes ON.

These probabilities $p_{ji}$ can be used in a test that determines whether the data storage device 12 can satisfy one or more performance requirements for an assigned group of workloads S1 to Sn. The test is based on a phased, correlated model of I/O activity in the group of workloads S1 to Sn assigned to the data storage device 12. Each workload S1 to Sn is assumed to exhibit phase behavior (i.e., turn ON and OFF). The performance of the data storage device 12 may be measured by attributes such as stability, capacity, speed and Quality-of-Service guarantees. Only as many as n tests are performed to determine whether the data storage device 12 satisfies the performance requirements for the given group of n workloads S1 to Sn.

A performance requirement $R(\cdot)$ based on I/O request rate is deemed satisfied if $$R(\lambda_1(t), \lambda_2(t), \lambda_3(t), \ldots, \lambda_n(t)) < C$$

for all times t, where C is a given constraint representing a performance requirement, and $\lambda_i(t)$ represents the I/O request rate of the $i^{th}$ workload Si at time t. The performance requirement $R(\cdot)$ is said to be an increasing function if $x_1 \geq x'_1, x_2 \geq x'_2, x_3 \geq x'_3, \ldots, x_n \geq x'_n \rightarrow R(x_1, x_2, x_3, \ldots, x_n) \geq R(x'_1, x'_2, x'_3, \ldots, x'_n)$. If the performance requirement $R(\cdot)$ is an increasing function, it increases when one of the request rates $\lambda(t)$ increases. This being the case, it is sufficient to test the inequality $R(\cdot) < C$ at instants $t_j$ when an arbitrary workload Si comes ON.

If the request rates $\lambda_i(t_j)$ at instants $t_j$ are not directly available from a workload model, the following approximation may be made:

$$\lambda_i(t_j) \approx E[\lambda_i(t_j)] = \Lambda_i p_{ji}$$

where $\Lambda_i$ is an I/O activity rate of the process $X_i$ describing the I/O activity of workload Si, and $p_{ji}$ represents the probability that workload Si is already ON at time $t_j$ when the $j^{th}$ workload Sj comes ON. The process $X_i$ may be a modulated ON/OFF process, in which there is little or no activity during the OFF phase. The workload Si may be described by a modulated ON/OFF Poisson process or some other process, such as a modulated ON/OFF renewal process or a modulated ON/OFF fluid-flow process.

Using this approximation, the performance requirement $R(\cdot)$ is reduced to a straightforward evaluation of the n conditions, that is:

$$R(\Lambda_1 p_{j1}, \Lambda_2 p_{j2}, \Lambda_2 p_{j3}, \ldots, \Lambda_n p_{jn}) < C$$

for j=1, 2, 3, ..., n.

Moreover, the I/O activity rates $\Lambda_i$ may be modeled as other than a product of the distribution process Xi and the probability of overlap $p_{ij}$. For example, the request rates $\lambda_i(t_j)$ may be modeled as $p_{ji} > z$ then $\lambda_i(t_j) = \Lambda_i$
$p_{ji} \leq z$ then $\lambda_i(t_j) = 0$
where $0 < z < 1$.

Stability of the data storage device 12 can be tested using a standard utilization test. For example, let C=1 and $$R(\lambda_1(t_j), \lambda_2(t_j), \lambda_3(t_j), \ldots, \lambda_n(t_j)) = \Sigma \Lambda_i p_{ji} a_i$$

for i=1 to n and j=1 to n, where $a_i$ represents the mean time to service requests from the $i^{th}$ workload Si. The resulting n inequalities $$\sum_{i=1}^{n} \Lambda_i p_{ji} a_i < 1$$

denote whether the data storage device 12 can service I/O requests faster than the I/O requests come into the device 12 at the time when the $j^{th}$ workload Sj comes ON. If all n inequalities are satisfied, the data storage device 12 is deemed stable for the assigned group of workloads S1 to Sn. Thus, as many as n tests are performed to determine whether the data storage device 12 is stable.

Figure 4:
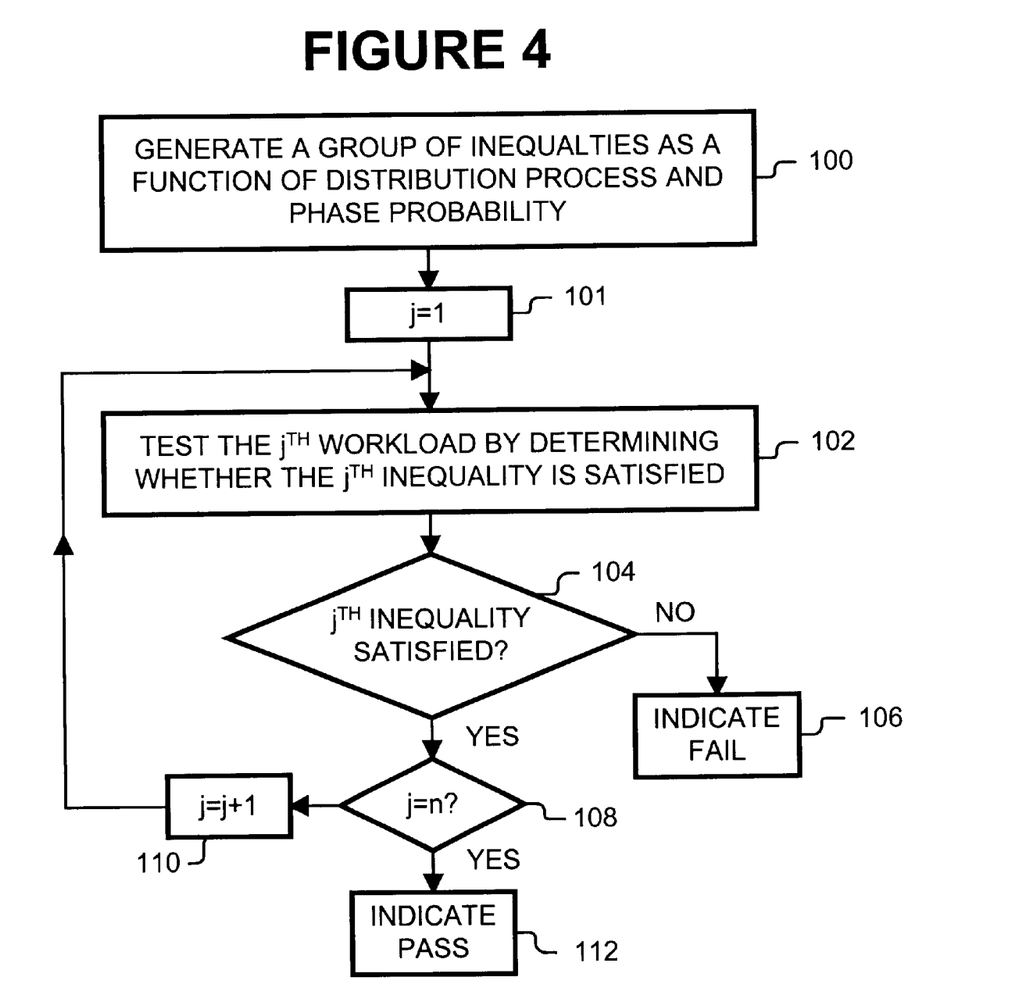
FIG. 4 is a flowchart of a method for determining whether a performance requirement is satisfied for a given group of workloads assigned to the data storage device.

FIG. 4 provides an illustration of this computationally fast and efficient method of testing whether a device satisfies performance requirements for an assigned group of n workloads S1 to Sn. At least one inequality for each workload is generated as a function of a distribution process and a phase probability (block 100). Starting with j=1 (block 101), the $j^{th}$ workload Sj is tested by determining whether the $j^{th}$ inequality is satisfied (block 102). If the jth inequality is not satisfied, an indication is made that the data storage device 12 does not satisfy the performance requirement for the assigned group of n workloads S1 to Sn (block 106). If the $j^{th}$ inequality is satisfied, the next workload is tested (blocks 108,110). If all n inequalities are satisfied (blocks 108 and 110), an indication is made that the data storage device 12 is deemed to have satisfied the performance requirement for all n workloads S1 to Sn (block 112). Thus, up to n tests are performed to determine whether the data storage device 12 satisfies the performance requirement for the assigned group of workloads S1 to Sn.

The method described in FIG. 4 is not limited to testing stability of the data storage device 12. The method may be used to test other attributes such as speed, capacity and Quality of Service ("QoS") guarantees.

For example, a group of n inequalities may be generated for a Quality of Service guarantee for response time. Say a client wants 95% of all requests to be served by the data storage device 12 within a bound time of T seconds. This is equivalent to saying that the 0.95-quantile (i.e., the $95^{th}$ percentile) of response time of the device 12 must not exceed the bound time of T seconds.

Figure 5:
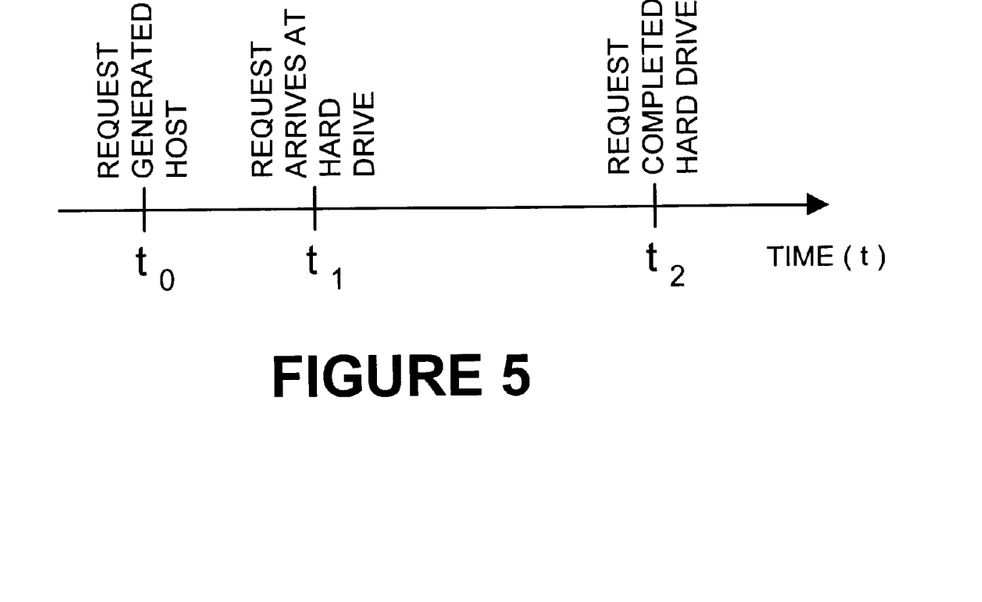
FIG. 5 is an illustration of response time of the data storage device.
Figure 6:
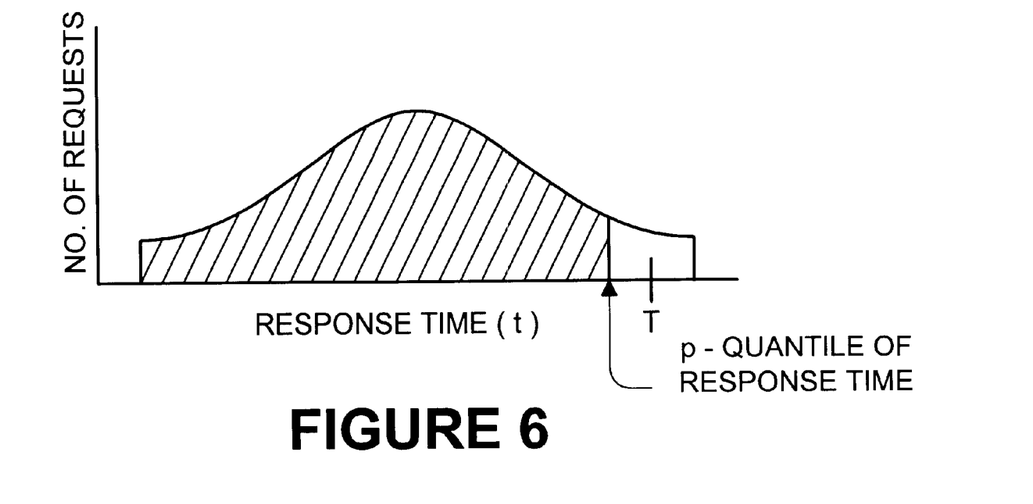
FIG. 6 is an illustration of an approximation of a p-quantile of the response time.

Illustrations of response time and its p-quantile are provided in FIGS. 5 and 6. The host 10 generates an I/O request at time t0, and the request arrives at the data storage device 12 at time t1. The data storage device 12 completes the I/O request at time t2. The response time is equal to t2−t1.

The total work arriving at the data storage device 12 during the period between time t and t+T is represented by W(t, t+T). It can be approximated that if the p-quantile of W(t, t+T) is less than T at all times t, then the response time of I/O requests is less than T with probability p or, equivalently, that the p-quantile of response time is less than T. The p-quantile of W(t, t+T) can be estimated in terms of its mean and variance by approximating W(t, t+T) as a normal distribution:

$$W_p(t, t+T) \approx E[W(t, t+T)] + \Phi^{-1}(p)\{\text{Var}[W(t, t+T)]\}^{1/2}$$

where $\Phi(\cdot)$ is the cumulative distribution function of a unit normal variable and $\Phi^{-1}(\cdot)$ is the inverse function of $\Phi(\cdot)$, that is, $\Phi^{-1}[\Phi(x)] = x$ for all x.

Other distributions such as a Gamma distribution or a log-normal distribution may be used instead to approximate the distribution of W(t, t+T), which would lead to a different formula for $W_p(t, t+T)$.

Since $W_p(t, t+T)$ is an increasing function of $\lambda_1(t)$, $\lambda_2(t), \ldots, \lambda_n(t)$, $W_p(t, t+T)$ can be tested for all t by testing that $W_p(t_j, t_j+T) < T$ for j=1, ..., n.

If the I/O request processes are assumed to be modulated ON/OFF Poisson processes, then the mean and variance of $W(t_j, t_j+T)$ at time t can be estimated as:

$$E[W(t_j, t_j+T)] = \sum_{i=1}^{n} p_{ji} \Lambda_i a_j T$$

and $$\text{Var}[W(t_j, t_j+T)] = \sum_{i=1}^{n} p_{ji} \Lambda_i (a_j^2 + b_j) T + \sum_{i=1}^{n} p_{ji}(1 - p_{ji}) \Lambda_i^2 a_j^2 T^2.$$

Thus, the condition $W_p(t, t+T) < T$ can be rewritten as $$\sum_{i=1}^{n} p_{ji} \Lambda_i a_i T + \Phi^{-1}(p) \sqrt{\sum_{i=1}^{n} p_{ji} \Lambda_i (a_i^2 + b_i) T + \sum_{i=1}^{n} p_{ji}(1 - p_{ji}) \Lambda_i^2 a_i^2 T^2} < T$$

for j=1 to n. Whether the data storage device 12 can respond to p percent of all requests in a time of T or less for a given group of workloads may be tested by solving up to n inequalities. The test is based on two variables that are easy to compute: mean and variance of service time.

Service time is device-dependent. It might depend upon factors such as capacity of the device, access time, throughput rate, etc. A slower device, for instance, will have a longer average service time.

The mean and variance for service time may be accessed from a database of device parameters. These parameters could be provided by device specifications, which are available from device manufacturers. In the alternative, the mean and variance of service time may be measured. A specific application could be directly measured to see how long each request takes to come back. Measurements of mean and variance would be specific to each type of data storage device. Thus, there would be one group of mean and variance for one type of data storage device, another group of mean and variance for another type of storage device, etc.

The bound time T is a tunable parameter: the smaller the bound time T, the more stringent the performance requirement. For feasibility, the bound time T is larger than the hard drive service time for a single request. The bound time T might also be driven by business or customer needs. If the host 10 is a video server, for example, frames would typically be supplied within $\frac{1}{30}^{th}$ of a second; otherwise the video would freeze. Thus, the bound time T for a video server might be T=0.033 seconds or less.

The testing method described above is useful for capacity planning of an enterprise system including a large number of data storage devices. Because the testing is fast and efficient, a large number of different configurations can be tested, and an optimal configuration can be selected.

Figure 7:
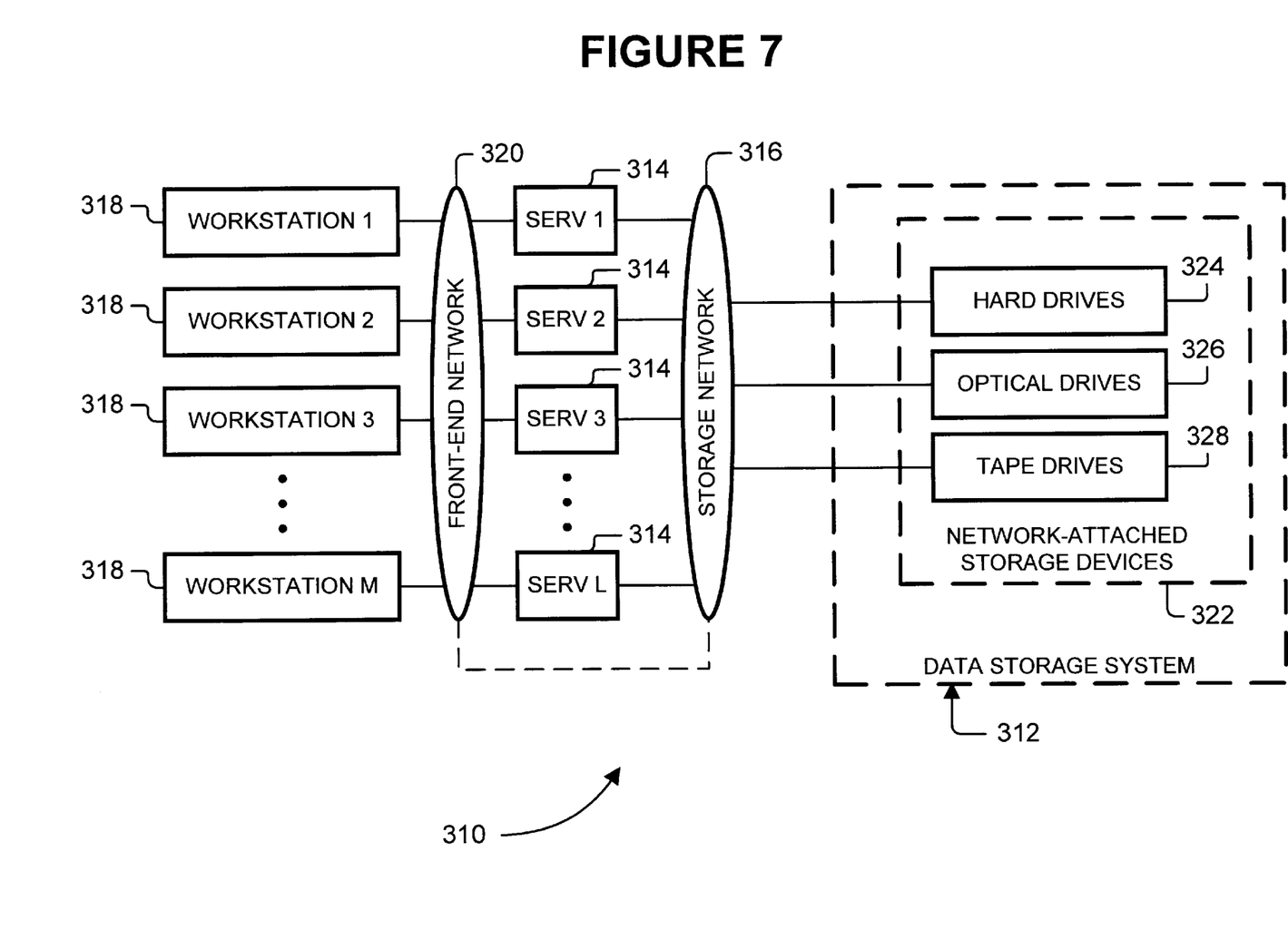
FIG. 7 is a block diagram of an enterprise system.

Reference is now made to FIG. 7, which shows an enterprise system 310 to be tested. The enterprise system 310 includes a data storage system 312 and a plurality of servers 314 that communicate with the data storage system 312 via a network 316 such as a fiber-channel network. The servers 314 communicate with a plurality of workstations 318 via a front-end network 320. Alternatively, the workstations 318 may bypass the servers 314 and communicate directly with the storage network 316, as shown by the dashed, line.

The data storage system 312 includes a plurality of network-attached storage devices ("NASD") 322 connected to the storage network 316. The NASD 322 might include any number and types of drives, such as hard drives 324, optical drives 326, and tape drives 328. The data storage system 312 is not limited to the NASD 322.

Each server 314 is capable of running one or more applications. Certain applications data might be resident in the servers, and application data (e.g., databases, backup files) might be stored across the data storage devices 324, 326, 328 in the data storage system 312.

Users of the enterprise system 310 can communicate with the servers 314 through the workstations 318. When a workstation 318 performs an operation, it might send an I/O request to a server 314 to retrieve information stored in the data storage system 312. Upon receiving the I/O request, the server 314 determines the location of the requested information and then retrieves the information from one or more of the devices 324, 326, 328 in the data storage system 312. The server 314 then sends the requested information to the workstation 318 making the request.

Figure 8:
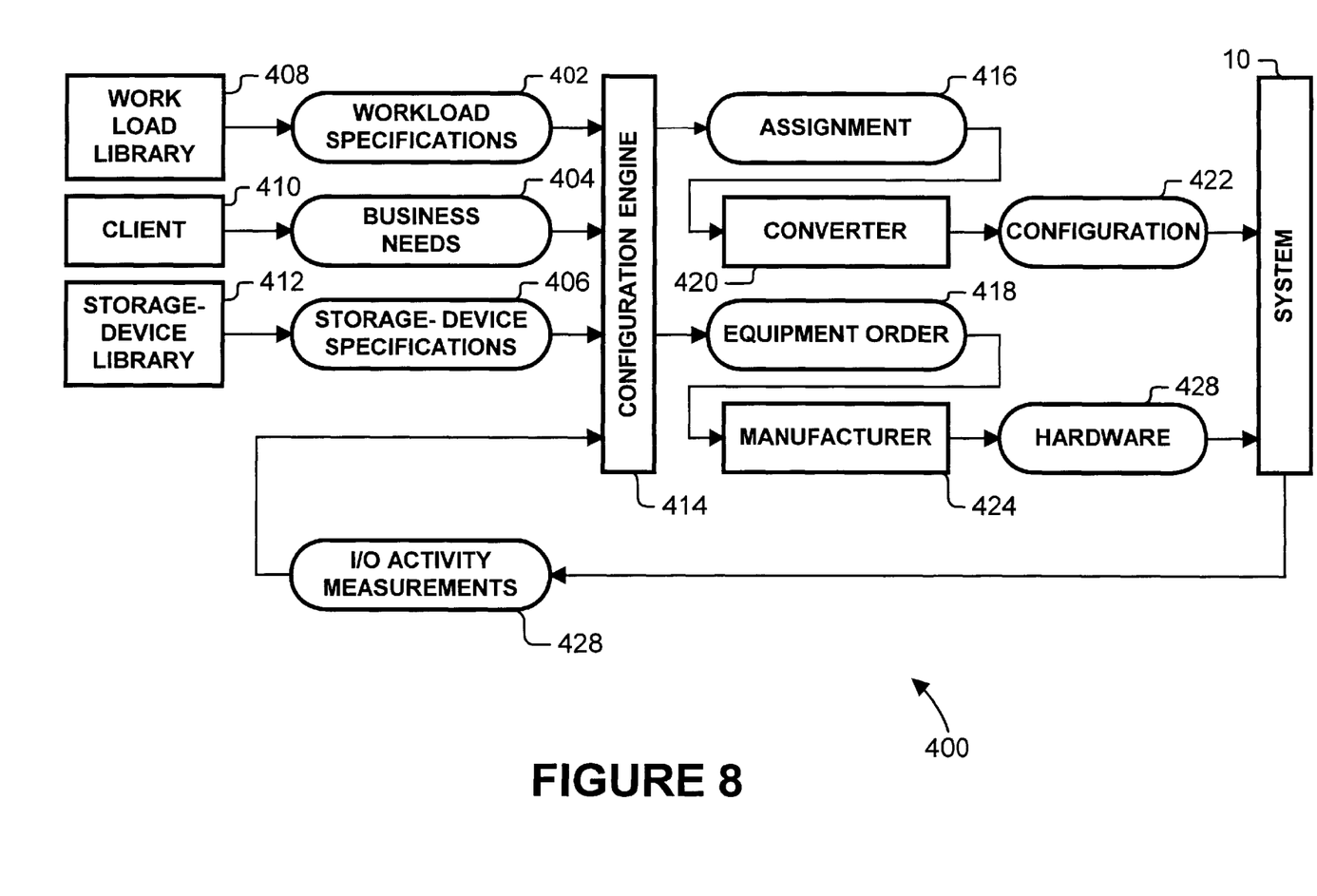
FIG. 8 is a block diagram of a system for configuring the enterprise system of FIG. 7.

FIG. 8 shows a procedure 400 for configuring, monitoring and evaluating the enterprise system 310. During initial configuration, information such as workload specifications 402, business needs 404, and storage-device specifications 406 are provided to a configuration engine 414. This information may be stored in databases such as a workload library 408, a client database 410 and a storage device library 412. In response to this information, the configuration engine 414 generates an initial configuration for the enterprise system 310.

The workload specifications 402 may be determined by performing an informed assessment of the workload requirements for the enterprise system 310. Such an assessment might include predictions of current workload requirements and growth trends in workloads. A workload prediction might be based on loads generated by a predetermined number of users in existing computer systems. These predictions may be made by knowledgeable system designers.

The business needs 404 might include system attributes that are desired by a customer or client. Such attributes might include transaction rates, response times, relative performance requirements, growth expectations, cost-versus-performance emphasis, and availability goals.

The storage device specifications 406 might include information relating to the specification (e.g., capacity) and performance of available storage devices, including physical drives, optical drives, and tape drives.

The configuration engine 414 uses the information 402, 404, 406 stored in the databases 408, 410, 412 to explore possible configurations for the enterprise system 310. Overlap probabilities $p_{ji}$, means and variances of service requests, and I/O request rates $\Lambda_1, \Lambda_1, \ldots, \Lambda_n$ are accessed from the databases 408, 410, 412. If a QoS guarantee for response time is being tested, the value of the inverse cumulative distribution $\Phi^{-1}(p)$ may also be looked up in a table and entered into the configuration engine 414.

Using the testing method illustrated in FIG. 4, the configuration engine 414 can test many different configurations to determine which one provides optimal performance. After having identified the optimal configuration for the enterprise system 310, the configuration engine 414 generates an assignment 416 and an equipment order 418. The assignment 418 is a description of what needs to be done to configure the enterprise system 310. For example, the assignment 416 might contain information describing the allocation of data across the data storage devices 324, 326, 328 of the data storage system 312. The assignment 416 might also contain information describing how the storage devices 324, 326, 328 are to be configured. For example, the assignment 416 might describe redundancy levels for disk arrays, network connections and topologies, assignment of logical units to controllers, and so on.

The assignment 416 is inputted to a converter 420, which translates the information in the assignment 416 into a configuration 422. The converter 420 may accomplish this task by, for example, generating logical volume manager (LVM) scripts and DG Clariion (Galaxy) disk-array configuration commands.

The equipment order 418 is supplied to an equipment supplier or manufacturer 424 who provides hardware 426 necessary to build the enterprise system 310. The hardware 426 is then connected and configured according to the configuration 422 to produce the enterprise system 310.

Once built and running, the enterprise system 310 may be monitored for behavior and performance, thereby resulting in the generation of I/O activity measurements 428. The I/O activity measurements may be made by any host (e.g., a server or workstation) having access to the system traces in the enterprise system 310. Among the measurements 428 are the I/O activity attributes for the stores and streams. These actual measurements of attributes could replace certain initial estimates used by the configuration engine 414. For example, once the enterprise system 310 is built, concurrency of I/O activity can be measured for each store and stream. Thus, the measurements for phase probability, means and variances of service times, and request rates $\Lambda_1, \Lambda_1, \ldots, \Lambda_n$ could replace the initial estimates. This would allow the configuration engine 414 to select a new optimal configuration based on the actual measurements rather than the estimations. The enterprise system 310 would then be modified according to the new configuration.

The measurements 428 also allow changes in the workloads and device configurations (e.g., changes caused by long-term device failure) to be identified and subsequently corrected. The configuration engine 414 may incrementally modify the assignment 416 to the point at which more equipment is needed for the enterprise system 310 to operate with the desired attributes. Thus, measuring the attributes enables the configuration engine 414 to modify the configuration in response to subsequent changes in workloads, hardware, etc.

Assignee's U.S. Ser. No. 09/249,399 filed on Feb. 12,1999, the specification of which is incorporated herein by reference, discloses a method and apparatus for gathering system traces and generating various attributes characterizing I/O activity for each stream corresponding to a store. The attributes for streams may be statistics of I/O activity distribution. The statistics may include means and variance, histograms or other statistical measurements. The attributes generated for each stream may include, without limitation, the following:

1) requestSize (statistics regarding size of the requested data);
2) requestRate (statistics regarding request rate during bursty I/O periods);
3) runCount, (statistics regarding a degree of sequential access);
4) onTime and offTime (statistics regarding phasing or "burstiness" of I/O activity); and
5) overlapFraction (statistics regarding the likelihood of two workloads being on at the same time).

Characterizing the I/O activity in this way can significantly improve the worst-case analysis of the performance of the data storage system 312. The requestRate, requestSize and runCount attributes may be used to characterize needed throughput in the data storage system 312. In addition, the overlap Fraction attribute might be used to determine better Quality of Service ("QoS") guarantees regarding response time, than what is feasible based just on requestRate, requestSize and runCount attributes.

Figure 9:
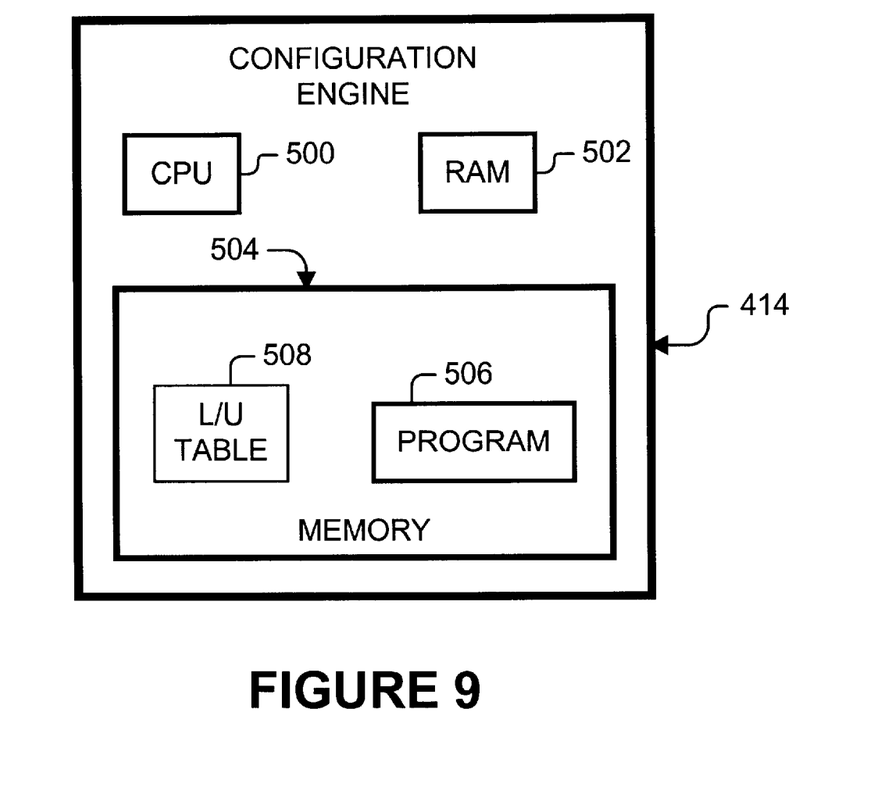
FIG. 9 is a block diagram of a configuration engine for the system shown in FIG. 8.

Referring now to FIG. 9, the configuration engine 414 includes one or more central processing units 500, random access memory 502, and persistent (long term) memory 504 such as one or more hard drives. The persistent memory stores a program 506 (including executable instructions and data) for instructing the central processing unit 500 to determine whether each data storage device of the enterprise system 310 can satisfy the performance requirement. The inverse cumulative distribution $\Phi^{-1}(p)$ may be determined by accessing a lookup table 508, which is also stored in the long term memory 504. The program 506 and lookup table 508 may be loaded into the long-term memory 504 via a peripheral device (e.g., a CD ROM drive) or via a network connection (e.g., a connection to the Internet).

Thus disclosed is fast and simple testing to determine whether a device satisfies a performance requirement for an assigned group of n workloads. Only as many as n inequalities may be checked for the device. Only the parameters, which are device-dependent, change for testing different devices. Simplicity and speed of testing makes it easier to test a wider range of initial configurations for a data storage system. This, in turn, allows a better choice for the optimal configuration.

Simplicity and speed also allows the testing to be performed more frequently after the system has been configured. Dynamic conditions of the system (e.g., the addition of new applications, performance degradation of existing storage devices) can be monitored and identified more frequently, and the system can be reconfigured Consequently, data can be allocated more efficiently so that queuing delays are limited, new devices do not have to be added, etc.

The testing is flexible. It is not limited to the tests for stability and QoS described above. Tests for other attributes may be performed. A different attribute may be tested by generating a group of inequalities for that attribute and determining whether the inequalities are satisfied.

Accordingly, the invention is not limited to the specific embodiments described and illustrated above. Instead, the invention is construed according to the claims that follow.

What is claimed is:

1. A method of using a computer to determine whether a data storage device satisfies a performance requirement for an assigned group of workloads, the method comprising:

determining at least one performance requirement model for each workload in the group, each model being an increasing function of request rate, the request rate of a given workload being approximated by a distribution process describing ON/OFF behavior of the given workload; and using the computer to evaluate at least one model in the group to determine whether the device satisfies the performance requirement.

2. The method of claim 1, wherein the request rate of a given workload is further approximated by phase probabilities correlating ON/OFF behavior of the given workload to other workloads in the group.

3. The method of claim 2, wherein each phase probability represents the probability of the given workload already being ON when another workload comes ON.

4. The method of claim 2, wherein the request rate of an $i^{th}$ workload is represented by $p_{ji}\Lambda_i$, where $\Lambda_i$ is I/O activity rate of a modulated ON/OFF process, and $p_{ji}$ is the phase probability that a $i^{th}$ workload is already ON when a $j^{th}$ workload comes ON, whereby the function $R(p_{ji}\Lambda_1, \ldots, p_{jn}\Lambda_n)<C$ is evaluated for each j=1 to n, where R is the increasing function, and n is the number of workloads in the group.

5. The method of claim 4, wherein stability of the device is tested by evaluating:

$$\sum_{i=1}^{n} p_{ji}\Lambda_i a_i < C$$

for each j=1 to n, where C is a constant, $a_i$ is mean service time of the device.

6. The method of claim 4, wherein a p-quantile of QoS for response time of the device is tested by evaluating:

$$\sum_{i=1}^{n} p_{ji}\Lambda_i a_i T + \Phi^{-1}(p)\sqrt{\sum_{i=1}^{n} p_{ji}\Lambda_i(a_i^2 + b_i)T + \sum_{i=1}^{n} p_{ji}(1-p_{ji})\Lambda_i^2 a_i^2 T^2} < T$$

for each j=1 to n, where $a_i$ is mean service time of the device, and $b_i$ is variance of service time.

7. The method of claim 1, wherein the distribution process is a modulated ON/OFF process.

8. The method of claim 1, wherein the distribution process is a Poisson process.

9. The method of claim 1, further comprising the step of using the computer to indicate whether the device satisfies the performance requirement.

10. Apparatus for testing a plurality of data storage devices, the apparatus comprising:

first means for generating a configuration in which groups of workloads are assigned to the data storage devices; and second means for determining whether each device, as configured in the configuration, satisfies a performance requirement, the second means determining at least one performance requirement model for each workload in each group, each model being an increasing function of request rate, the request rate being approximated by a distribution process describing workload ON/OFF behavior and phase probabilities correlating ON/OFF behavior of pairs of workloads in the same group; and third means for evaluating at least one model of each group to determine whether each device as configured satisfies its performance requirement.

11. The apparatus of claim 10, further comprising fourth means for supplying the distribution processes and phase probabilities to the second means.

12. The apparatus of claim 10, further comprising fourth means, responsive to the third means, for indicating whether each device satisfied its performance requirement.

13. Apparatus for determining whether a data storage device satisfies a performance requirement for an assigned group of workloads, the apparatus comprising:

a processor;

memory encoded with a program that, when executed, instructs the processor to determine at least one performance requirement condition for each workload in the group, and determine whether any of the at least one condition is not satisfied;

each condition being an increasing function of request rate, the request rate being approximated by a distribution process describing workload ON/OFF behavior and phase probabilities correlating ON/OFF behavior of pairs of workloads in the group.

14. The apparatus of claim 13, wherein the request rate of an $i^{th}$ workload is represented by $p_{ji}\Lambda_i$, where $\Lambda_i$ is I/O activity rate of a Poisson process, and $p_{ji}$ is the phase probability that a $i^{th}$ workload is already ON when a $j^{th}$ workload comes ON, whereby the function $R(p_{ji}\Lambda_1, \ldots, p_{jn}\Lambda_n)<C$ is evaluated for each j=1 to n, where R is the increasing function, and n is the number of workloads in the group.

15. The apparatus of claim 14, wherein whether the device satisfies a stability requirement is determined by evaluating:

$$\sum_{i=1}^{n} p_{ji}\Lambda_i a_i < C$$

for each j=1 to n, where C is a constant, and $a_i$ is mean service time of the device.

16. The apparatus of claim 14, wherein whether the device satisfies a p-quantile of QoS for response time requirement is determined by evaluating:

$$\sum_{i=1}^{n} p_{ji}\Lambda_i a_i T + \Phi^{-1}(p)\sqrt{\sum_{i=1}^{n} p_{ji}\Lambda_i(a_i^2+b_i)T + \sum_{i=1}^{n} p_{ji}(1-p_{ji})\Lambda_i^2 a_i^2 T^2} < T$$

for each j=1 to n, where $a_i$ is mean service time of the device, and $b_i$ is variance of service time.

17. The apparatus of claim 13, wherein each condition is represented as an inequality, and wherein the performance requirement is not satisfied if any inequality is not satisfied.

18. The apparatus of claim 13, wherein each phase probability represents the probability of the given workload already being ON when another workload comes ON.

19. The apparatus of claim 13, wherein the distribution process is a modulated ON/OFF process.

20. The apparatus of claim 13, wherein the distribution process is a Poisson process.

21. An article for causing a configuration engine to model a performance requirement of a data storage device with respect to an assigned group of workloads, the article comprising:

computer memory; and a program encoded in the computer memory, the program, when executed, causing the configuration engine to determine a performance requirement model as an increasing function of request rate, the request rate approximated by a distribution process describing workload ON/OFF behavior and phase probabilities correlating ON/OFF behavior of pairs of workloads in the group.

22. The article of claim 21, wherein the request rate of an $i^{th}$ workload is represented by $p_{ji}\Lambda_i$, where $\Lambda_i$ is I/O request rate of a Poisson process, and $p_{ji}$ is the phase probability that a $i^{th}$ workload is already ON when a $j^{th}$ workload comes ON, whereby the function $R(p_{ji}\Lambda_1, \ldots, p_{jn}\Lambda_n)<C$ is evaluated for each j=1 to n, where R is the increasing function, and n is the number of workloads in the group.

23. The article of claim 22, wherein whether the device satisfies a stability requirement is determined by evaluating:

$$\sum_{i=1}^{n} p_{ji}\Lambda_i a_i < C$$

for each j=1 to n, where C is a constant, $a_i$ is mean service time of the device, $\Lambda_i$ is the I/O request rate of the process, and $p_{ji}$ is the phase probability that a $i^{th}$ workload is already ON when a $j^{th}$ workload comes ON.

24. The article of claim 22, wherein whether the device satisfies a p-quantile of QoS for response time requirement is determined by evaluating:

$$\sum_{i=1}^{n} p_{ji}\Lambda_i a_i T + \Phi^{-1}(p)\sqrt{\sum_{i=1}^{n} p_{ji}\Lambda_i(a_i^2+b_i)T + \sum_{i=1}^{n} p_{ji}(1-p_{ji})\Lambda_i^2 a_i^2 T^2} < T$$

for each j=1 to n, where $a_i$ is mean service time of the device, $b_i$ is variance of service time, $\Lambda_i$ is the I/O request rate of the process, and $p_{ji}$ is the phase probability that a $i^{th}$ workload is already ON when a $j^{th}$ workload comes ON.

25. The article of claim 21, wherein each phase probability represents the probability of the given workload already being ON when another workload comes ON.

26. The article of claim 21, wherein the distribution process is a modulated ON/OFF process.

27. The article of claim 21, wherein the distribution process is a Poisson process.

28. The article of claim 21, wherein the article further causes the configuration engine to test the model to determine whether the model is satisfied.

29. The article of claim 21, wherein the model comprises a series of inequalities, and wherein the model is satisfied if all of the inequalities are satisfied.

* * * * *